Patented July 30, 1940

2,209,911

UNITED STATES PATENT OFFICE 2,209,911

PROCESS FOR PREPARING ALKYLATED AROMATIC ETHER HALIDES

Herman A. Bruson and John W. Eastes, Philadelphia, Pa., assignors to Röhm & Haas Company, Philadelphia, Pa.

No Drawing. Application May 3, 1937,
Serial No. 140,453

13 Claims. (Cl. 260—613)

This invention relates to a process for preparing aromatic alkylene ether halides of the general formula $$A-R(O-C_nH_{2n})_xY$$

wherein A is a hydrocarbon radical of the aliphatic, cycloaliphatic, or arylaliphatic series, R is an aromatic nucleus, Y is a halogen atom, $x$ is an integer less than four, $C_nH_{2n}$ is an alkylene group, and $n$ is an integer greater than one.

It is well known that compounds containing an aromatic radical can be condensed in the presence of anhydrous aluminum chloride, by means of the Friedel-Crafts reaction, with a compound containing an aliphatically-bound halogen atom whereby hydrogen halide is split out.

We have observed that in certain cases when the aromatic nucleus and the aliphatically-bound halogen atom are part of the same molecule, aluminum chloride will not bring about a condensation between two molecules of the compound, or split out hydrogen halide therefrom. Compounds of this kind are those in which the halogen atom and the aromatic nucleus are separated from each other by a chain of alkylene oxy groups containing at least one alkylene group having more than one carbon atom between the halogen and the oxygen atoms, or between successive oxygen atoms.

Such compounds may be designated by the general formula $$R-(O-C_nH_{2n})_xY$$

in which R, $n$, $x$ and Y have the meanings given above. Typical examples of these aromatic ether halides are:

β-phenoxyethyl chloride,
$$C_6H_5-O-C_2H_4Cl$$
β-phenoxy-β'-chlorodiethyl ether,
$$C_6H_5-O-C_2H_4-O-C_2H_4Cl$$
β-phenoxy-β'-chlorodiisopropyl ether,
$$C_6H_5-O-CH_2-CH(CH_3)-O-CH(CH_3)-CH_2Cl$$
β-2-naphthoxy-β'-chlorodiethyl ether,
$$C_{10}H_7-O-C_2H_4-O-C_2H_4Cl$$
β-phenoxy-β'-chloroethoxy diethyl ether,
$$C_6H_5-O-C_2H_4-O-C_2H_4-O-C_2H_4Cl$$
and their homologues.

We have found that aromatic ether chlorides of the above kind can be nuclearly condensed by means of Friedel-Crafts catalysts with a variety of alkylating agents. These alkylating agents are members of the following classes of compounds: Compounds containing an olefinic linkage, compounds containing an alcoholic hydroxyl group and compounds containing a labile aliphatically-bound halogen atom. Compounds containing the labile halogen atom include the alkyl, cycloalkylene and aralkyl halides which in the presence of a Friedel-Crafts condensing agent will condense with an aromatic nucleus by splitting out hydrogen halide. These are distinct from those compounds, the aromatic alkylene ether halides, in which the halogen atom although bound to an aliphatic carbon atom is so firmly held that aluminum chloride is incapable of causing it to react with an aromatic nucleus.

The following are typical examples of the various classes of alkylating agents:

*Alkyl halides.*—Ethyl chloride, butyl chloride, amyl chloride, octyl chloride, dodecyl chloride, oleyl chloride, cetyl chloride, and the corresponding bromides or iodides, and similar compounds containing more than one halogen atom.

*Aralkyl halides.*—Benzyl chloride, β-phenyl ethyl chloride, etc.

*Cycloaliphatic halides.*—Cyclohexyl chloride, methyl-cyclohexyl chloride, etc.

*Olefinic compounds.*—Amylene, hexene, octene, diisobutylene, dodecylene, cetene, cyclohexene, terpinene, unsaturated acids such as oleic, undecylenic, etc., and their esters such as methyl undecylenate, etc.

*Alcohols.*—Benzyl alcohol, β-phenylethyl alcohol, cyclohexanol, butyl alcohols, amyl alcohols, dodecyl alcohol, cetyl alcohol and other aliphatic alcohols, α-terpineol, etc.

By the process of this invention it thus becomes possible to synthesize a wide variety of valuable aromatic alkylene ether halides in which the aromatic nucleus is attached to hydrocarbon radicals of the most diverse nature, by condensing aromatic alkylene ether halides of the formula hereinabove set forth, where R contains a readily replaceable nuclear hydrogen atom with alkylating agents in the presence of Friedel-Crafts type of condensing agents. Of these, anhydrous aluminum chloride is the cheapest and most effective, but it is possible to use others of the same class, such as boron fluoride, stannic chloride, and ferric chloride. Thus R may be a mononuclear or polynuclear aromatic residue. It may contain nuclear substituents which are relatively inert in the Friedel-Crafts reaction, such as hydrocarbon, alkoxy, or halogen groups. Y is preferably a chlorine atom, but may be any other halogen atom, such as bromine or iodine which, however, because of the greater ease of decomposition of the bromo or iodo ethers and their greater cost are not so desirable for the present purpose.

The process is not limited to the specific alkyl halides or olefines herein set forth, but may be practiced in general with compounds which contain a reactive halogen or hydroxyl group aliphatically bound to a hydrocarbon radical or an ethylenic linkage.

In practicing this invention, it has been found advantageous to mix the Friedel-Crafts condensing agent preferably with an inert organic solvent, such as carbon disulfide or petroleum ether, and then to add the alkylating agent, admixed with the aromatic alkylene ether halide, gradually to the well stirred mixture. The temperature is kept low at the beginning of the reaction and may be increased after the reaction has proceeded for some time. The products are then isolated in the usual manner of Friedel-Crafts reactions by decomposition with water, acids, or alkalides, and separation and purification of the desired substance.

In order to illustrate this invention more clearly, the following examples are given, but it is understood that the invention is not limited to these examples and that it may be applied to the obvious homologues and analogues of the components used.

Example 1

$$C_4H_9-C_6H_4-O-C_2H_4-O-C_2H_4Cl$$

A solution, consisting of 31 g. of n-butyl chloride and 67 g. of β-phenoxy-β'-chlorodiethyl ether, was slowly added to 45 g. of anhydrous aluminum chloride in 200 cc. of carbon disulfide. The mixture was then refluxed on the steam bath for 16 hours, after which the carbon disulfide was distilled off. The residue was decomposed with dilute hydrochloric acid and the oil layer separated, washed, and distilled. The butylphenoxyethoxyethyl chloride came over at 170° to 185° C./9 mm. as a colorless oil.

Example 2

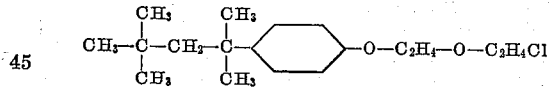

A solution consisting of 38 g. of diisobutylene (B. P. 100° to 104° C.) and 67 g. of β-phenoxy-β'-chlorodiethyl ether was slowly added to 45 g. of aluminum chloride in 200 cc. of carbon disulfide. After the initial reaction subsided, the mixture was refluxed for ten hours, the carbon disulfide distilled off, dilute hydrochloric acid added, and the oil layer separated, washed and distilled. The p-ter-octylphenoxyethoxyethyl chloride distilled at 180° to 200° C./10 mm. as a pale yellow oil.

Example 3

$$Dodecyl-C_6H_4-O-C_2H_4-O-C_2H_4Cl$$

45 g. of dodecylene (from dehydration of dodecyl alcohol) and 55 g. of β-phenoxy-β'-chlorodiethyl ether were mixed with 50 cc. of carbon disulfide, and this solution slowly added to a refluxing suspension of 45 g. of anhydrous aluminum chloride in 200 cc. of carbon disulfide. The reaction mixture was refluxed for four hours, then decomposed with dilute hydrochloric acid, and the solvent removed by distillation. The residual oil was washed and distilled in vacuo. The product was a pale yellow oil boiling at 235° to 260° C./10 mm. A similar product is obtained by using a molecularly equivalent amount of n-dodecyl chloride in place of the dodecylene.

Example 4

An admixture of 42 g. of benzyl chloride and 76 g. of β-naphthoxyethoxyethyl chloride was slowly added to 45 g. of anhydrous aluminum chloride in 200 cc. of carbon disulfide, while stirring, and the mixture was heated on the steam bath for six hours thereafter. After decomposing the reaction product with dilute hydrochloric acid, and steam distilling out the carbon disulfide, the oily product was taken up in benzene, washed with water, and vacuum distilled up to 240° C./10 mm. to remove any unreacted naphthoxyethoxyethyl chloride.

The residue in the still could not be distilled without decomposition. This material analyzed 10.30% chlorine, and consisted essentially of benzylnaphthoxyethoxyethyl chloride. It was a dark, viscous oil.

Example 5

An admixture of 51 g. of α-terpineol and 78 g. of o-chlorphenoxyethoxyethyl chloride was slowly added to 90 g. of anhydrous aluminum chloride in 200 cc. of carbon disulfide. Hydrogen chloride gas was given off during the reaction, which was refluxed for six hours after the addition.

Dilute hydrochloric acid was added to the reaction mixture, the carbon disulfide distilled out with steam, and the oily product taken up in ether. The ether solution was dried over anhydrous sodium sulfate, evaporated on the steam bath, and vacuum distilled.

The product distilling at 200° to 240° C./10 mm. was a yellowish oil containing 13.2% chlorine and containing a terpenic radical attached to the phenyl radical.

Example 6

An admixture of 41 g. of cyclohexene and 86 g. of o-methyl phenoxyethyl chloride was slowly added to 67 g. of anhydrous aluminum chloride in 200 cc. of carbon disulfide. After the addition, the reaction was refluxed for six hours. The reaction was treated with dilute hydrochloric acid, the carbon disulfide distilled out, the separating oil washed with water and vacuum distilled.

A clear, yellow oil, boiling at 180° to 200° C./11 mm. was obtained containing 13.30% chlorine, and consisting essentially of p-cyclohexyl-o-methylphenoxyethyl chloride.

The products obtained by the process herein set forth are useful as intermediates for preparing a variety of compounds; for example, the labile halogen atom on the terminal carbon atom of the ether chain of the compounds obtained by the present process can be reacted with metal sulfites to produce sulfonates; with sodium sulfide to produce thioethers; with alkali metal salts of fatty acids to form esters; with sodium hydrosulfide to produce mercaptans; with primary, secondary, or tertiary amines to form substituted amines or quaternary ammonium salts; with inorganic thiocyanates or dithiocarbamates to yield organic thiocyanates or thiocarbamates. The above compounds and their derivatives may thus find wide application as capillary-active compounds, textile assistants, plasticizers, resins, insecticides, and drugs, depending upon the groupings present.

We claim:

1. The process of preparing dodecyl phenoxyethoxyethyl chloride which comprises condensing β-phenoxy-β'-chlorodiethyl ether with n-dodecyl chloride in the presence of anhydrous aluminum chloride.

2. The process of preparing p-tertiary octyl phenoxyethoxyethyl chloride which comprises condensing β-phenoxy-β'-chlorodiethyl ether with diisobutylene in the presence of anhydrous aluminum chloride.

3. The process of preparing dodecyl phenoxyethoxyethyl chloride which comprises condensing β-phenoxy-β'-chlorodiethyl ether with dodecylene in the presence of anhydrous aluminum chloride.

4. The process of preparing alkyl substituted phenoxyethoxyethyl chlorides which comprises condensing a compound of the general formula R-O-C₂H₄-O-C₂H₄Cl in which R is a nucleus of the benzene series with an unsaturated aliphatic hydrocarbon in the presence of a Friedel-Crafts condensing agent.

5. The process of preparing alkyl substituted phenoxyethoxyethyl chlorides which comprises condensing a compound of the general formula R-O-C₂H₄-O-C₂H₄Cl in which R is a nucleus of the benzene series with an unsaturated aliphatic hydrocarbon in the presence of anhydrous aluminum chloride.

6. The process of preparing alkyl substituted phenoxyethoxyethyl chlorides which comprises condensing a compound of the general formula R-O-C₂H₄-O-C₂H₄Cl in which R is a nucleus of the benzene series with an alkyl chloride in the presence of a Friedel-Crafts condensing agent.

7. The process of preparing alkyl substituted phenoxyethoxyethyl chloride which comprises condensing a compound of the general formula R-O-C₂H₄-O-C₂H₄Cl in which R is a nucleus of the benzene series with an alkyl chloride in the presence of anhydrous aluminum chloride.

8. The process of preparing alkyl substituted phenoxyethylene ether halides which comprises condensing a compound of the general formula

R-(O-CH₂-CH₂)ₓY in which R is a nucleus of the benzene series, $x$ is an integer less than four and Y is a halogen atom, with an unsaturated aliphatic hydrocarbon in the presence of a Friedel-Crafts condensing agent.

9. The process of preparing alkyl substituted phenoxyethylene ether halides which comprises condensing a compound of the general formula

R-(O-CH₂-CH₂)ₓY in which R is a nucleus of the benzene series, $x$ is an integer less than four and Y is a halogen atom, with an alkyl chloride in the presence of a Friedel-Crafts condensing agent.

10. The process of preparing alkyl substituted phenoxyalkylene ether halides which comprises condensing a compound of the general formula

R-(O-CₙH₂ₙ)ₓY in which R is a nucleus of the benzene series, $n$ is an integer greater than one, $x$ is an integer less than four and Y is a halogen atom, with an unsaturated aliphatic hydrocarbon in the presence of a Friedel-Crafts condensing agent.

11. The process of preparing alkyl substituted phenoxyalkylene ether halides which comprises condensing a compound of the general formula

R-(O-CₙH₂ₙ)ₓY in which R is a nucleus of the benzene series, $n$ is an integer greater than one, $x$ is an integer less than four and Y is a halogen atom with an alkyl chloride in the presence of a Friedel-Crafts condensing agent.

12. The process of preparing alkyl substituted aryloxy alkylene ether halides which comprises condensing a compound of the general formula

R-(O-CₙH₂ₙ)ₓY in which R is an aromatic radical, $n$ is an integer greater than one, $x$ is an integer less than four and Y is a halogen atom, with a member of the group consisting of compounds containing an olefine linkage, compounds containing an alcoholic hydroxyl group and compounds containing a labile aliphatically bound halogen atom, in the presence of a Friedel-Crafts condensing agent.

13. The process of preparing alkyl substituted aryloxy ethylene ether halides which comprises condensing a compound of the general formula

R-(O-C₂H₄)ₓY in which R is an aromatic radical, $x$ is an integer less than four and Y is a halogen atom, with a member of the group consisting of compounds containing an olefine linkage, compounds containing an alcoholic hydroxyl group and compounds containing a labile aliphatically bound halogen atom, in the presence of a Friedel-Crafts condensing agent.

HERMAN A. BRUSON.
JOHN W. EASTES.